Figure 2:
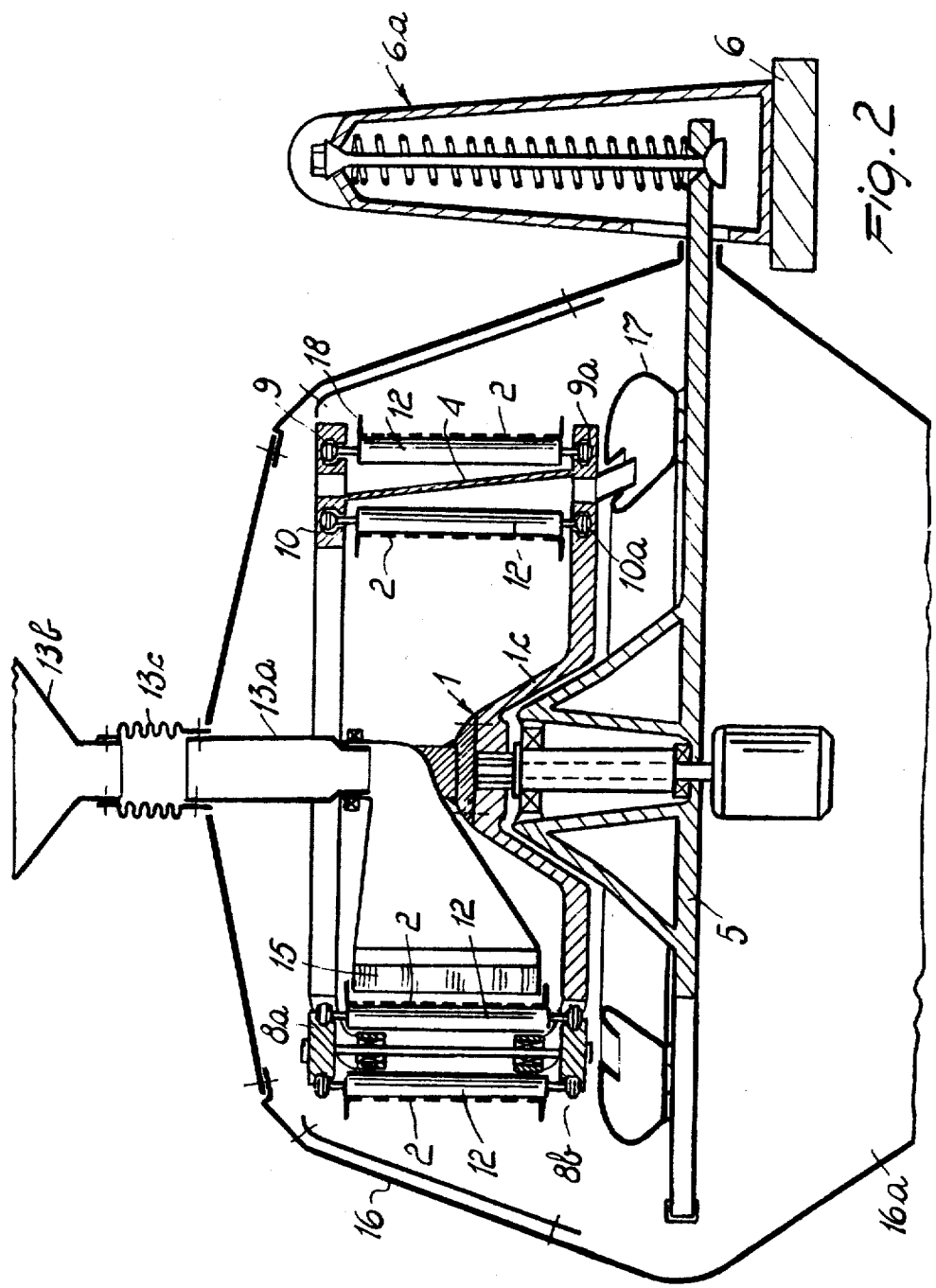

United States Patent [19]

Treplin et al.

[11] 3,875,063

[45] Apr. 1, 1975

[54] FILTER SCREENING DEVICE

[75] Inventors: Friedrich-Wilhelm Treplin, Hösel; Klaus Eimer, Ratingen; Heinz Thal, Lintorf, all of Germany

[73] Assignee: Ludwig Taprogge (Cleaning Installations for Pipe Heating Exchanger), Dusseldorf, Germany

[22] Filed: May 25, 1973

[21] Appl. No.: 363,796

[30] Foreign Application Priority Data
May 26, 1972 Germany.......................... 2225726

[52] U.S. Cl................ 210/304, 210/405, 210/409, 210/456
[51] Int. Cl........................................... B01d 29/42
[58] Field of Search .......... 210/137, 422, 454, 456, 210/405, 409

[56] References Cited
UNITED STATES PATENTS
1,917,203  7/1933  Heinz........................... 210/409 X
3,724,669  4/1973  Thal.............................. 210/409
3,789,992  2/1974  Treplin et al..................... 210/456 X

*Primary Examiner*—Frank A. Spear, Jr.
*Attorney, Agent, or Firm*—Craig & Antonelli

[57] ABSTRACT

An improved filtering device is described of the type that separates solid materials from a liquid stream. The device includes in a pipeline a housing with a liquid inlet and outlet connection and a cylindrical filter screen which separates the solids from the liquid stream. An adjusting valve is arranged in the inlet connection to pivot about an axis spaced from the peripheral surface of the housing by a distance equal to the radius of the valve. In this manner, the liquid stream is excited into a swirling flow about the cylindrical filter, thereby removing deposited solids from the surface.

9 Claims, 2 Drawing Figures

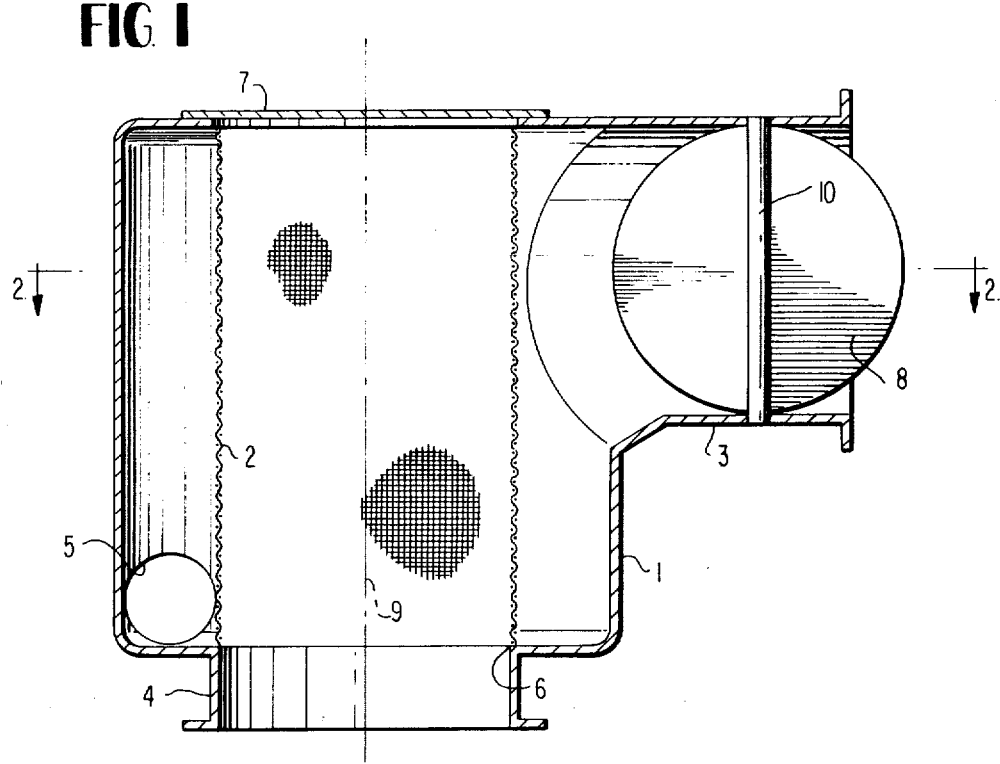
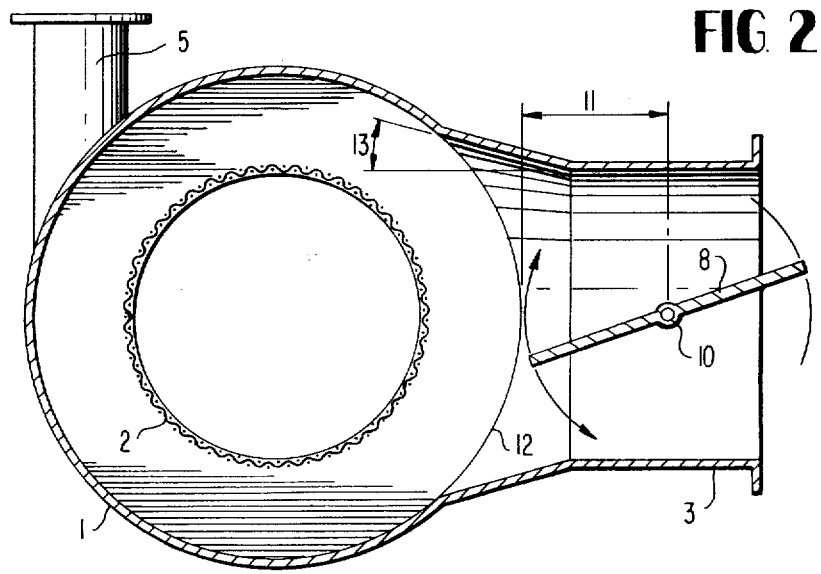

FILTER SCREENING DEVICE

This invention relates to a filtering, or screening device for the separation of solids from a liquid stream in a pipeline. The filtering device is of the type including a cylindrical separator housing having a cylindrical screen, or filter, disposed within the separator housing. A radial inlet pipe connection and an axial outlet pipe connection are secured to the separator housing to pass the liquid stream into and out of the filter device. A discharge pipe, or duct, is also secured to the separator housing for discharging solids separated from the liquid stream by the cylindrical filter.

Moreover, the invention is of the type in which an adjusting valve is pivotally arranged in the radial inlet pipe connection, and the discharge pipe for the separated solids includes a tangential discharge duct near the bottom of the separator housing, such as found in the copending U.S. patent application, Ser. No. 196,474, filed Nov. 8, 1971, by Friedrich-Wilhelm Treplin, Guido Veltmann and Heinz Thal, and assigned to the same assignee as the present invention now U.S. Pat. No. 3,789,992. A filtering installation of this type serves mainly as a so-called shell filter in cooling water systems for power plants. In addition, other types of contamination and impurities may be separated from the cooling water by the present filtering installation, such as, for example, fibrous material including algae, weeds, leaves, and, more frequently in recent times, residues of used packaging foils.

In a filtering installation of this type, solid impurities entrained on a liquid stream entering the filtering device through the radial inlet pipe connection are deposited on the cylindrical screen, or filter, and the filtered liquid stream flows out the outlet pipe connection. In order to facilitate the removal of deposited impurities on the cylindrical filter screen, an adjusting valve, pivotally arranged in the radial inlet pipe connection, permits an intense swirling flow about the filter screen basket, so that the swirling flow first removes the impurities from the screen and carries the impurities, optionally after contacting the wall of the separating housing, toward the discharge duct. A small partial stream of the liquid stream exits through the discharge duct carrying the solid impurities out of the separator housing.

This arrangement for removing the solid particles from the surface of the screen basket functions best when the swirling flow of the liquid stream around the surface of the screen basket remains at a minimum velocity under all operational conditions. Furthermore, a sufficient turbulence super-imposed on this circular flow is a primary condition of the performance of the arrangement. The super-imposed turbulence is preferably in the form of a vortex street with the average size of the vortex being large as compared to the size of the particles to be removed from the surface of the screen basket.

However, at certain adjustments of the adjusting valve it is possible that the intake stream strikes the surface of the screen basket, or the surface of the housing, thereby disturbing the vortex street and reducing the size of the individual vortices which consequently lose their ability to remove the particles from the surface of the screen basket. Accordingly, the range of regulation of the filtering device is limited. The present invention, on the other hand, provides a means for minimizing the disturbances of the swirling flow caused by the adjusting valve, thereby minimizing pressure losses which are unavoidable in such an arrangement.

The present invention achieves this reduction in disturbances in the swirling flow by arranging the axis of the adjusting valve at a spacing from the peripheral circle, or the extension of the peripheral surface of the separator housing through the opening at the inlet pipe connection with the separator housing, by a distance which corresponds to approximately the radius of the adjusting valve. Thus, in outwardly pivoted positions of the adjusting valve, wherein a swirling flow is excited, the adjusting valve shall not practically project into the above-mentioned peripheral circle.

Accordingly, by a surprisingly simple and yet very effective means, the present invention achieves a filtering installation of the above-mentioned type in which the swirling liquid flow remains free of disturbances in order to remove solid impurities from the outer surface of a cylindrical filtering screen. This function is achieved by placing the adjusting valve in the radial inlet pipe connection at a position wherein the pivotal axis of the valve is at a distance corresponding to the radius of the valve from the peripheral circle of the separator housing.

In another embodiment of the present invention, it has been found that the stability of the swirling flow is enhanced if the inlet pipe connection widens, or flares at the connection with the separator housing. The use of flaring portions in the inlet pipe connection have been suggested in filtering devices which do not use adjusting valves in the inlet pipe connections. It has been found, however, that the stability of the swirling flow is enhanced wherein the inlet pipe connection flares preferably at a flaring angle at about 15° or more.

Furthermore, it has been found to conveniently arrange the axis of the cylindrical screen in the separator housing eccentrically with respect to the axis of the separator housing. This is especially convenient in cases where the swirling flow is kept continuously in operation due to the high amount of debris influx to the filter. By this eccentricity a similar intensity of the swirling flow can be maintained across the total surface of the cylindrical screen. The eccentricity of the axis of the cylindrical screen with respect to the axis of the separator housing may be up to about 300°, measured from the point of entry in direction of the swirling flow.

Accordingly, the advantages of the present invention are achieved by the proper arrangement of the adjusting valve within the inlet pipe connection of a filtering device for removing solid impurities carried on a liquid stream. Thus, according to the present invention, the stability and intensity of the swirling flow around the screen in the separator housing is not impaired by the adjusting valve. Moreover, with the proper adjustment of the adjusting valve, the swirling flow can be excited over wide ranges of adjustment and differing operating conditions of the filtering installation. In this manner, a swirling flow is formed in each case which is an optimum for the desired cleaning of the filter screen of the present device.

The invention will be described in greater detail below with reference to the drawings showing the embodiment of the present invention. The drawings are schematic views.

FIG. 1 is an axial section through a filtering, or screening, installation according to the invention; and FIG. 2 is a section along line 2—2 through the installation of FIG. 1.

The filtering installation shown in FIGS. 1 and 2 serves to separate solid impurities from a liquid stream in a pipeline by straining the liquid stream through a cylindrical filter screen 2 included within a cylindrical separator housing 1. The filtering screen 2 is preferably disposed concentrically within the separator housing and connected to a housing lid 7 at one end and to an axial outlet pipe connection 4 at the other end. A radial inlet pipe connection 3 is secured to the separator housing 1 such that the liquid stream flows into the separator housing through the filter screen 2 and out the outlet pipe connection 4. A separate discharge duct 5 is secured to the separator housing in order to discharge the solid impurities. The discharge duct 5 is connected to the separator housing near the screen base 6 of the cylindrical screen 2 and is preferably tangential with respect to the separator housing.

An adjusting valve 8 is disposed in the radial inlet pipe connection 3 in order to regulate the liquid stream into a swirling flow about the cylindrical filter screen basket 2. The adjusting valve 8 is preferably a circular butterfly valve and is pivotally mounted about an axis 10 in order to adjust the incoming liquid stream. According to the present invention, the pivotal axis 10 of the adjusting valve 8 is arranged at a distance 11 from the peripheral circle 12 of the separator housing 1, which distance approximately corresponds to the radius of the adjusting valve 8. The adjusting valve 8, in addition, has a diameter corresponding to the diameter of the radial inlet pipe connection 3.

Thus, in a vertically arranged filtering installation, according to the present invention, a liquid stream having solid impurities entrained thereon enters at the top of the separator housing 1 through the radial inlet pipe connection 3. The adjusting valve 8 is adjusted to permit a stable swirling flow around the cylindrical filter screen 2 wherein the swirling flow is regulated to a sufficient intensity, so as to remove solid impurities settled on the screen 2 and carry these impurities down to the discharge duct 5.

In a further arrangement of the present invention, the inlet pipe connection 3 is widened, or flared, in the manner of a trumpet, at the connection with the separation housing 1. A preferred construction of this invention is to provide the flaring angle 13 in FIG. 2 to be at least about 15° and even considerably larger.

It is to be understood that the present invention is not limited to the described embodiment, but is susceptible to numerous changes and modifications as known to those skilled in the art; and therefore, the present invention is not to be limited to the details shown and described herein but is intended to cover all changes and modifications as are encompassed by the scope of the appended claims.

What we claim is:

1. In a filtering installation for separating solids from liquid streams in pipelines, said filtering installation comprising a cylindrical separator housing means, a cylindrical filtering means disposed within said separator housing means, radial inlet pipe connection means disposed at a peripheral surface of said separator housing means for introducing a liquid stream carrying solids into said separator housing means, an outlet pipe connection means disposed axially adjacent an end of said cylindrical filtering means for discharging said liquid stream after passing through said cylindrical filtering means, a discharge means connected to said separator housing means for discharging solids separated from said liquid stream by said cylindrical filtering means, and valve means pivotally arranged in said inlet pipe connection means for adjusting the flow of said introduced liquid stream, the improvement comprising said valve means being a circular butterfly valve element pivotal about an axis spaced from a peripheral circle of said cylindrical separator housing at a distance corresponding at least to the radius of said circular valve element, and said inlet pipe connection means flaring at the connection with said separator housing means at a flaring angle of at least 15°.

2. A filtering installation according to claim 1, wherein said cylindrical filtering means is a cylindrical mesh screen basket with one end secured to a housing lid of said separator housing means and an opposite end connected to said outlet pipe connection means.

3. A filtering installation according to claim 1, wherein said discharge means is arranged adjacent to said outlet pipe connection means.

4. A filtering installation according to claim 1, wherein said radial inlet pipe connection means is connected to said separator housing at one end of said cylindrical housing.

5. A filtering installation according to claim 4, wherein said discharge means is connected to said separator housing axially downstream of said radial inlet pipe connection means such that said solids separated from said liquid stream are carried downstream from said radial inlet pipe connection means to said discharge means by a small partial stream of said liquid stream.

6. A filtering installation according to claim 5, wherein said discharge means is connected to said separator housing at an opposite end of said cylindrical housing from said radial inlet pipe connection means, said discharge means being adjacent to said outlet pipe connection means.

7. A filtering installation according to claim 6, wherein said discharge means is connected tangentially to said cylindrical separator housing.

8. A filtering installation according to claim 1, wherein said separator housing is arranged in a vertical position with said radial inlet pipe connection means being connected to an upper surface of said separator housing and said discharge means being connected to a lower surface of said separator housing.

9. A filtering installation according to claim 1, wherein said pivotal axis of said circular butterfly valve element is parallel to the cylindrical axis of said cylindrical filtering means.

* * * * *